J. R. PRATT.
ELECTRODE HOLDER.
APPLICATION FILED NOV. 14, 1914.

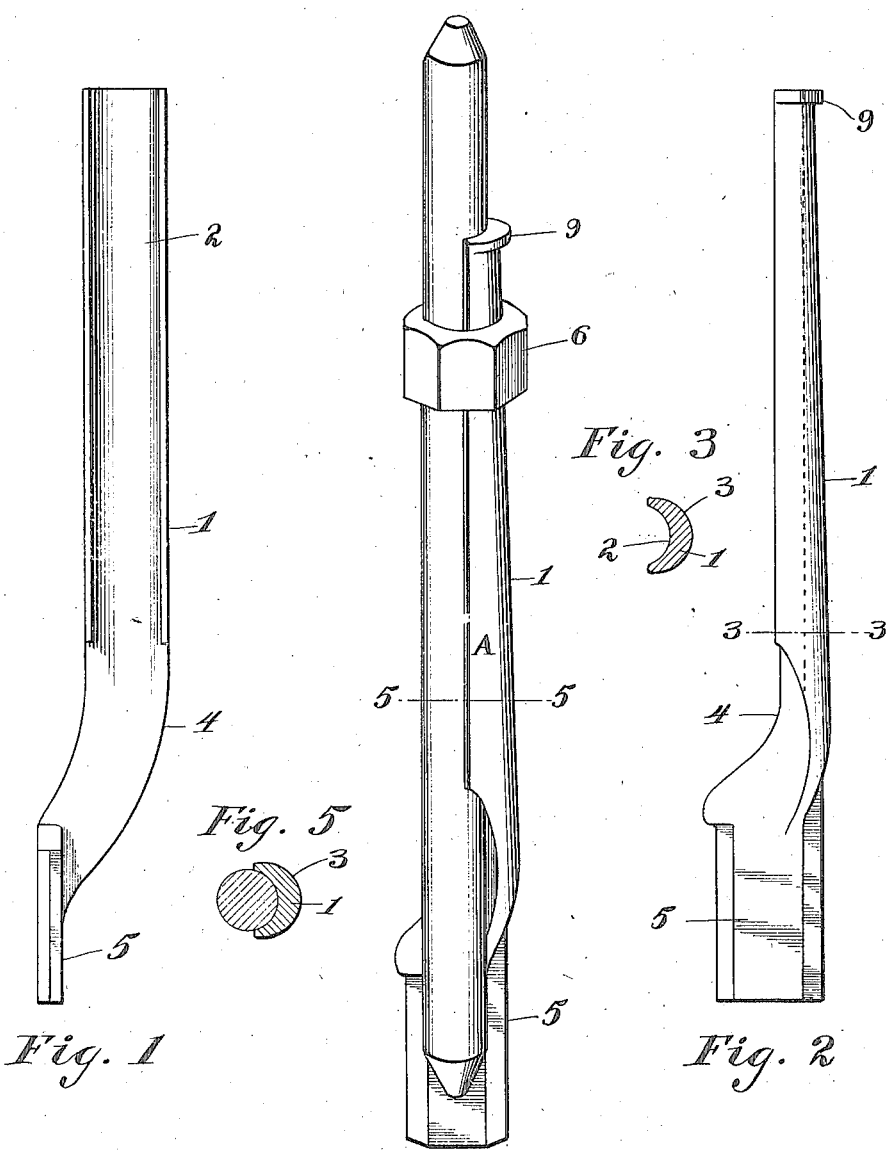

1,166,256.

Patented Dec. 28, 1915.
2 SHEETS—SHEET 2.

Witnesses
C. F. Rudolph
John J. McCarthy

Inventor
James R. Pratt,
By Victor J. Evans
Attorney

UNITED STATES PATENT OFFICE.

JAMES R. PRATT, OF DENISON, TEXAS.

ELECTRODE-HOLDER.

1,166,256.   Specification of Letters Patent.   Patented Dec. 28, 1915.

Application filed November 14, 1914. Serial No. 872,220.

*To all whom it may concern:*

Be it known that I, JAMES R. PRATT, a citizen of the United States of America, residing at Denison, in the county of Grayson and State of Texas, have invented new and useful Improvements in Electrode-Holders, of which the following is a specification.

This invention relates to improvements in electrode holders and has particular application to an electrode holder for the head lights of steam locomotives, interurban cars and analogous vehicles.

In carrying out the present invention, it is my purpose to improve and simplify the general construction of metallic electrode holders and to provide a holder wherein the electrode will be held in solid contact with the body of the holder at all times so as to prevent overheating of the electrode and the consequent premature burning out or melting of the electrode.

A further object of my invention is to provide an electrode holder whereby the electrode will be securely held in contact with the holder and against movement relatively thereto in the travel of the engine or other car and whereby the binding action between the electrode and the holder will be increased as the holder is jarred or shaken. And furthermore, my improved electrode holder is so constructed that the binding action between the holder and the electrode increases as the copper electrode expands under the action of the heat from the arc.

A still further object of my invention is to provide an electrode holder which will accommodate a relatively long electrode so that the heat of the arc may be dissipated along the length of the electrode by conduction and from the electrode by radiation, thus enabling a heavier current to be used for illuminating purposes.

With the above and other objects in view, the invention consists in the construction, combination and arrangement of parts hereinafter set forth in and falling within the scope of the claims.

Figure 6:
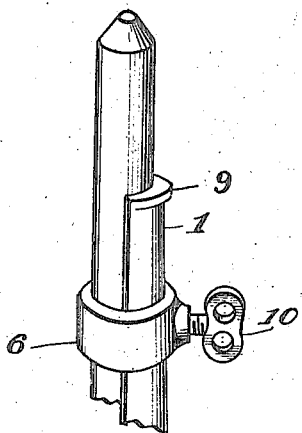
Figure 7:
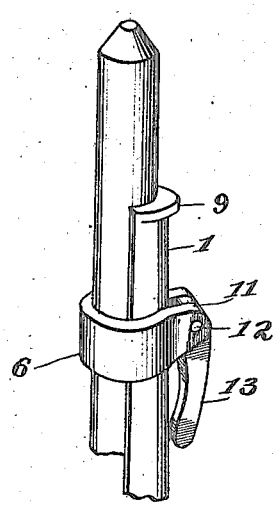
Figure 8:
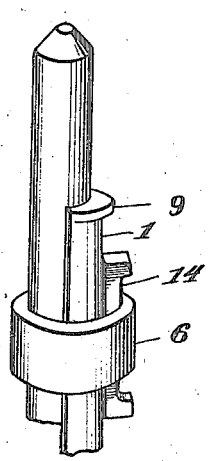
Figure 9:
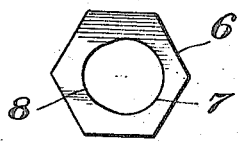
Figure 10:
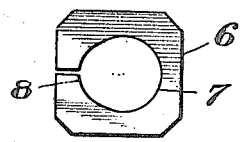
Figure 11:
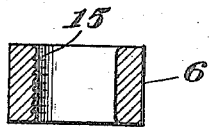

In the accompanying drawings; Figure 1 is a view in side elevation of an electrode holder constructed in accordance with the present invention. Fig. 2 is a view in edge elevation of the holder taken at right angles to Fig. 1. Fig. 3 is a cross sectional view on the line 3—3 of Fig. 2. Fig. 4 is a perspective view of the holder and the electrode therein. Fig. 5 is a cross sectional view through the holder and the electrode. Fig. 6 is a perspective view showing a modified form of clamping means for the electrode. Fig. 7 is a similar view showing a still further modification. Fig. 8 is a like view of another modified construction of clamping means for the electrode. Fig. 9 is an end view of the clamping collar employed in the preferred form of the invention. Fig. 10 is an end view showing a modified form of collar. Fig. 11 is a longitudinal sectional view showing a still further modified form of clamping collar.

Referring now to the drawings in detail, and particularly to the form of my invention illustrated in Figs. 1 to 5 inclusive, A designates the electrode holder as an entirety, such holder comprising a body 1 concavo-convex in cross section and having the concaved face 2 thereof conforming to the cross sectional contour of the electrode so that the holder and the electrode will be in contact throughout the entire area of the holder when the electrode is placed therein.

The convexed face 3 of the body 1 of the holder gradually increases in thickness in cross dimension downwardly from the upper end toward the lower portion thereof and adjacent to its lower portion the body 1 is relatively thin in cross section as at 4 and twisted at an angle of approximately ninety degrees and formed integral with the lower extremity of the twisted portion and disposed at an angle of ninety degrees to the body 1 is a supporting leg 5 adapted to enter the socket or receptacle of the usual clamp in the head lamp.

Encircling the body 1 of the holder is a clamping collar 6 having a portion of the bore thereof conforming to the shape of the outer wall of the body as at 7 and the remaining portion of the bore shaped to conform to the configuration of the electrode as at 8 and when the electrode is disposed within the body the clamping collar is capable of downward movement along the body and the electrode so as to produce a wedging action, incident to the formation of the outer surface of the body and the bore of the collar, thereby effectively clamping the electrode within the concaved face of the body of the holder.

Formed on the upper end portion of the body 1 and extending outwardly therefrom at right angles to the concaved face thereof is a stop lug 9 designed to limit the upward movement of the clamping collar to release the electrode and prevent accidental disconnection of the clamping collar from the electrode holder.

When the electrode is disposed within the holder and clamped therein by means of the clamping collar, as clearly illustrated in Figs. 4 and 5, it will be seen that the concaved face of the body of the holder contacts with the adjacent portion of the electrode throughout the entire area of such face of the body, thereby preventing overheating of the electrode and the consequent shortening of the life thereof. Furthermore, it will be noted that the relatively thin cross sectional lower end portion of the body permits such body to be moved slightly relatively to the leg 5 after the leg has been secured within the socket, thereby permitting proper centering of the carbon and copper electrodes of the head light. If desired, the clamping collar 6 may be formed with a threaded aperture leading onto the convexed face of the body to receive a set screw 10; or, the collar 6 may be split as in Fig. 7 and have the terminals thereof outturned and formed with alining openings 11 to receive a pivot pin 12 carrying a cam lever 13, the cam end of the lever contacting with the convexed face of the holder. By means of this latter structure, it will be seen that when the collar has been moved along the body of the holder to the desired position, the cam lever may be swung to active position so as to increase the clamping action between the electrode and the body. Again, the clamping collar may be formed in such manner as to accommodate a wedge 14 as shown in Fig. 8, the wedge being "driven home" when the collar has been moved downwardly along the body of the holder and the electrode therein to the required extent.

In the preferred form of the invention, the clamping collar is hexagonal in cross section, although it is to be understood that the clamping nut may be of any desired shape in cross section. If desired, the clamping collar may have the inner surface thereof formed with teeth 15 as illustrated in Fig. 11 so as to insure proper contact between the clamping collar and the holder and electrode.

In some instances, particularly, when using large electrodes, the electrodes expand in cross section under the action of the heat and in order to provide for such expansion I employ a clamping collar constructed as illustrated in Fig. 10. In this figure, I have shown the clamping collar as formed with a slot in the side thereof and this slot permits the collar to open slightly when the copper electrode expands and to close when the electrode is restored to normal condition or cooled.

From the foregoing description taken in connection with the accompanying drawings, the construction and manner of employing my improved electrode holder will be readily apparent. It will be seen that I have provided an electrode holder whereby the copper electrode of the head light will be held in proper position at all times and which permits the use of a relatively long electrode.

While I have herein shown and described certain preferred forms of my invention by way of illustration, I wish it to be understood that I do not limit or confine myself to the precise details of construction herein described and delineated, as modification and variation may be made within the scope of the claims without departing from the spirit of the invention.

I claim:

1. An electrode holder comprising a body concavo-convexed in cross section and having the concaved face thereof conforming to the cross sectional contour of the electrode to contact with the latter throughout the area of such face and the convexed face thereof gradually increasing in cross dimension from the upper end toward the lower end, and a collar encircling said holder and having a portion of the bore thereof conforming to the shape of the outer wall of such body and the remaining portion of the bore shaped to conform to the configuration of the electrode and capable of downward movement along the holder to bind the electrode to the body of the holder.

2. An electrode holder comprising a body concavo-convexed in cross section and having the concaved face thereof conforming to the cross sectional contour of the electrode to contact with the latter throughout the area of such face and the convexed face thereof gradually increasing in cross dimension from the upper end toward the lower end, a collar encircling said holder and having a portion of the bore thereof conforming to the shape of the outer wall of such body and the remaining portion of the bore shaped to conform to the configuration of the electrode and capable of downward movement along the holder to bind the electrode to the body of the holder, and means coöperating with the collar to augment the action thereof.

3. An electrode holder comprising a body concavo-convexed in cross section and having the concaved face thereof conforming to the cross sectional contour of the electrode to contact with the latter throughout the area of such face and the convexed face thereof gradually increasing in cross dimension from the upper end toward the lower end, and a collar encircling said holder and having a portion of the bore thereof conforming to the shape of the outer wall of such body and the remaining portion of the bore shaped to conform to the configuration of the electrode and capable of downward movement along the holder to bind the electrode to the body of the holder, the lower portion of said body being reduced in cross section and twisted at an angle of ninety degrees, and a leg formed on the lower end of the twisted portion and disposed at an angle of ninety degrees to said body.

4. An electrode holder comprising a body concavo-convexed in cross section and having the concaved face thereof conforming to the cross sectional contour of the electrode to contact with the latter throughout the area of such face and the convexed face thereof gradually increasing in cross dimension from the upper end toward the lower end, a collar encircling said holder and having a portion of the bore thereof conforming to the shape of the outer wall of such body and the remaining portion of the bore shaped to conform to the configuration of the electrode and capable of downward movement along the holder to bind the electrode to the body of the holder, and a stop on the upper extremity of said body to limit the movement of said clamping collar to release position.

5. An electrode holder comprising a body concavo-convexed in cross section and having the concaved face thereof conforming to the cross sectional contour of the electrode to contact with the latter throughout the entire area of such face and the convexed face gradually increasing in cross dimension from the upper end toward the lower end, and a collar encircling said holder and the electrode therein and capable of downward movement along the body to produce a clamping action between the holder and body.

6. An electrode holder comprising a body concavo-convexed in cross section and having the concaved face thereof conforming to the cross sectional contour of the electrode to contact with the latter throughout the entire area of such face and the convexed face gradually increasing in cross dimension from the upper end toward the lower end, a collar encircling said holder and the electrode therein and capable of downward movement along the body to produce a clamping action between the holder and electrode, and means carried by said collar and coöperating therewith to augment the action thereof.

7. An electrode holder comprising a body concavo-convex in cross section and having the concaved face thereof conforming to the cross sectional contour of the electrode to contact with the latter throughout the entire area of such face and the convexed face gradually increasing in cross dimension from the upper end toward the lower end, and means encircling said holder and the electrode therein and capable of downward movement along the body to produce a clamping action between the electrode and the holder.

In testimony whereof I affix my signature in presence of two witnesses.

JAMES R. PRATT.

Witnesses:
 TIMOTHY HYNES,
 W. F. J. WINCKINS.